United States Patent [19]

Vasey et al.

[11] Patent Number: 4,970,540

[45] Date of Patent: Nov. 13, 1990

[54] IMAGE STABILIZATION APPARATUS

[75] Inventors: Francois Vasey, Lausanne; Marcel Arditi, Geneva, both of Switzerland

[73] Assignee: Canon Kabushiki Kaisha, Tokyo, Japan

[21] Appl. No.: 488,508

[22] Filed: Mar. 5, 1990

Related U.S. Application Data

[63] Continuation of Ser. No. 415,477, Oct. 2, 1989, abandoned, which is a continuation of Ser. No. 259,787, Oct. 19, 1988, abandoned.

[30] Foreign Application Priority Data

Oct. 19, 1987 [CH] Switzerland .......................... 4094/87
Oct. 19, 1987 [CH] Switzerland .......................... 4095/87

[51] Int. Cl.$^5$ .............................................. G03B 5/00
[52] U.S. Cl. .................................... 354/202; 350/531; 354/70
[58] Field of Search ........................ 354/65, 70, 202; 350/530

[56] References Cited

U.S. PATENT DOCUMENTS 3,703,999 11/1972 Forys et al. ....................... 354/70 X
3,982,255 9/1976 Orlando ............................... 354/70
4,302,830 11/1981 Hamaoka et al. ............... 350/247 X
4,780,739 10/1988 Kawakami et al. .............. 354/70 X

FOREIGN PATENT DOCUMENTS

62-152279 7/1987 Japan .

Primary Examiner—Michael L. Gellner
Attorney, Agent, or Firm—Fitzpatrick, Cella, Harper & Scinto

[57] ABSTRACT

This specification discloses an image stabilization apparatus provided with correcting optical means for compensating image vibration, driving means for driving the correcting optical means, and controlling means for controlling the action of the driving means in response to the approach of the driving limit of the correcting optical means.

16 Claims, 4 Drawing Sheets

IMAGE STABILIZATION APPARATUS

This application is a continuation of application Ser. No. 415,477 filed Oct. 2, 1989, which is a continuation of application Ser. No. 259,787 filed Oct. 19, 1988, both applications now abandoned.

BACKGROUND OF THE INVENTION

1. Field of the invention

This invention relates to an image stabilization apparatus for preventing an image vibration on the imaging plane in a camera or the like caused by hand vibration or the like.

2. Related Background Art

As the image stabilization apparatus as described above, mention may be made of an apparatus covered, for example, in the applicant's U.S. application Ser. No. 280,731. This apparatus is such that a correcting optical system for correcting image vibration is displaced in a plane substantially perpendicular to the photographing optic axis in a direction to compensate any image vibration on the imaging plane, i.e., the direction opposite to the direction of image vibration, to thereby prevent the image on the imaging plane from vibrating. Therefore, in this apparatus, two parallelogrammatic links each having a degree of freedom are series-connected so that their degrees of freedom are perpendicular to each other in a plane substantially perpendicular to said photographing optic axis, and said correcting optical system is held at the end thereof, whereby said correcting optical system becomes displaceable in the plane substantially perpendicular to the photographing optic axis in the direction opposite to the direction in which the image on the imaging plane vibrates, and said parallelogrammatic links are elastically urged against a cam, which is driven by a motor so as to displace the correcting optical system in the direction opposite to the direction of vibration, thereby preventing image vibration on the imaging plane.

Thus, in order to correct image vibration, it is necessary to displace the correcting optical system, but the amount by which the correcting optical system can be displaced is limited, and for example, in the case of the above-described apparatus, the cam is a snail cam and therefore, when the cam moves to a position beyond the terminal position, i.e., the minimum or maximum lift position, the correcting optical system returns to the start/end position, i.e., the maximum or minimum lift position, of the cam, and this has led to the problem that the direction of displacement is reversed to the same direction as the direction of image vibration to increase image vibration.

Also, where the optical instrument in which image vibration is to be prevented has a great vibration acceleration or where the optical instrument tries to recover from the error of velocity or displacement attributable to the unevenness of the cam surface the motor tries to produce a great acceleration, but in this case, there has been the problem that said correcting optical system becomes unable to follow the movement of the motor and the cam for driving the correcting optical system, whereby the image stabilization action cannot be accomplished.

SUMMARY OF THE INVENTION

The present invention has been made in view of the above-noted circumstances, and an object thereof is to provide an image stabilization apparatus which is provided with correcting optical means for preventing image vibration, driving means for driving said correcting optical system, and controlling means for controlling the action of said driving means in response to the approach of the driving limit of said correcting optical means, and which can solve the above-noted problems.

Other objects of the present invention will become apparent from the following detailed description of a specific embodiment thereof taken in conjunction with the accompanying drawings.

DESCRIPTION OF THE PREFERRED EMBODIMENT

An embodiment of the present invention will hereinafter be described with reference to the drawings.

The specification of an image stabilization apparatus shown in the following embodiment is determined, for example, on the basis of the result of the measurement of the frequency, amplitude and angular velocity of vibration acting on a camera having mounted thereon a telephoto lens of focal length 800 mm and open aperture f2.8 which was experimented with such camera. Of course, the technique of the present invention can likewise be applied to other optical instruments.

This experiment was carried out with a plurality of men and women. According to the result of the experiment, the frequency band of the vibration acting on the camera was between 1 Hz to 10–12 Hz. The average amplitude of the image displacement on the film surface which is the imaging plane during an exposure time of 1/60 sec. (i.e. 17 ms) is 60–80 μm, maximum amplitude is 200–260 μm. This maximum amplitude may reach 300 μm during 24 ms including the time 7 ms required for the movement of the shutter curtain of the camera, i.e., the time required for the exposure of the whole picture plane to be terminated.

In order that image vibration prevention may be made effective for the vibration having the characteristic as described above, it is necessary that the residual amplitude during the exposure time of 1/60 sec. be withheld within 20 μm.

Also, the highest linear velocity to be compensated for by a correcting optical system was 20 mm/s. Thereby, the maximum displacement of the correcting optical system for which correction can be effected during the exposure time of 1/60 sec. i.e., the whole exposure time of 24 ms, can be determined to about 0.5 mm.

Figure 1:
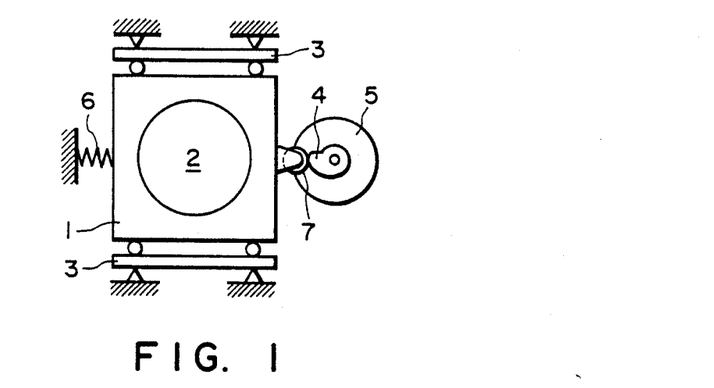
FIG. 1 shows the, driving mechanism of an optical compensating apparatus according to the present invention as it is one-dimensionally simplified.

FIG. 1 shows the construction of an optical compensating apparatus in which the aforedescribed applicant's image stabilization apparatus is simplified for the present embodiment, and particularly shows a one-dimensional element for optically compensating for the angular displacement of vibration caused by vibration of camera.

In FIG. 1, the reference numeral 2 designates a correcting optical system for correcting image vibration, and the reference numeral 1 denotes a movable portion for holding the correcting optical system 2, and one-dimensional movement thereof is guided in a plane perpendicular to the photographing optic axis by a guide device 3. The reference numeral 4 designates a cam driven by a motor 5 to move the movable portion 1. The cam 4 is fixed to the output shaft of the motor 5. The reference numeral 6 denotes a pressure-giving spring for pressing the movable portion 1 in a direction in which it is guided by the guide device 3. The spring 6 ensures a roller 7 provided on the movable portion 1 to bear against the cam 4 so that the movable portion 1 can follow the cam 4 through the roller 7.

Although not shown in FIG. 1, actually, a mechanism having a second degree of freedom and including an element similar to the shown mechanism for moving the correcting optical system 2 in a direction orthogonal to the shown mechanism is provided in a plane orthogonal to the photographing optic axis. Thereby the correcting optical system 2 can be freely moved in a direction to prevent image vibration in a plane perpendicular to the photographing optic axis.

With the above-described construction, when a vibration occurs to the camera, the direction and amount of the vibration are detected by a vibration detecting means to be described and the cam 4 displaced the correcting optical system 2 by a motor 5 in a plane perpendicular to the photographing optic axis in a direction to compensate image vibration, i.e., the direction opposite to the direction of the image vibration on the imaging plane, in conformity with the direction and amount of said vibration, thereby preventing the image vibration on the imaging plane.

A control construction for controlling the operation of the above-described mechanism will hereinafter be described, but in the following, for simplicity, description will be made only of the mechanism having a first degree of freedom shown in FIG. 1, and the mechanism having a second degree of freedom, not shown, is entirely identical thereto and need not be described.

Figure 2A:
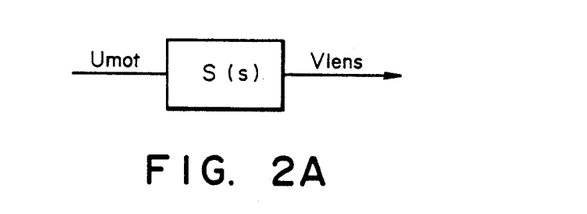
FIGS. 2A and 2B show analysis models including mechanical and electrical parameters acting on the optical compensating apparatus of FIG. 1.

FIG. 2A shows the input-output relation to the optical compensating apparatus S of FIG. 1. An input voltage $U_{mot}$ is input to the motor 5 of FIG. 1, and the velocity $V_{lens}$ of the correcting optical system 2 is output as an output signal.

Figure 2B:
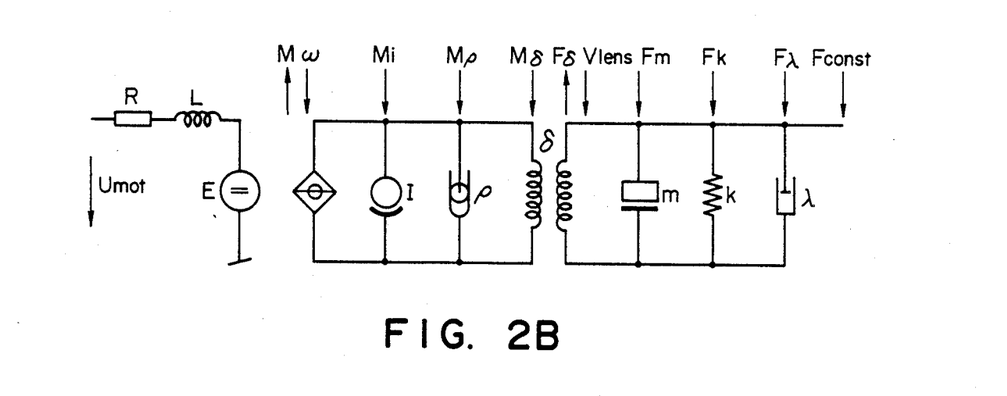

FIG. 2B represents all the electrical and mechanical parameters of the apparatus of FIG. 1 by symbols. The transfer functions of the apparatus of FIG. 1 are analyzed from this symbol representation. Four portions regarding the motor 5, the cam 4, the movable portion 1 and the pressure force $F_{const}$ of the pressure-giving spring 6 are included in FIG. 2B. The electrical portions of the DC motor 5 are a resistor R, an inductance L and the electromotive force E of the motor, and inertia I and friction ρ are included as the mechanical portions. The cam 4 is symbolized as a torque-force conversion coefficient δ. The movable portion 1 is symbolized by a mass m, the spring constant k of the pressure-giving spring, the dynamical friction λ of the spring and $F_{const}$ representative of the pressure and weight of the pressure-giving spring 6.

By analyzing these various parameters, the transfer functions S regarding the displacement of the correcting optical system 2 conforming to the voltage $U_{mot}$ applied to the DC motor 5 and the force $F_{const}$ can be obtained.

With regard to the electrical portions of the motor 5, the transfer functions of the symbolization model of FIG. 2 are:

$$M = \psi \cdot i$$

$$E = \psi \omega$$

$$U_{mot} - E = Ri + sLi$$

$$U_{mot} = (R + sL)i + \psi \omega$$

where M represents the output torque, ψ represents the torque coefficient, i represents the current, ω represents the angular velocity of the output shaft of the motor 5, and s represents Laplace operator.

With regard to the mechanical portions of the motor 5, $$M = Mi + M\rho + M\delta$$
$$= sI\omega + \rho \cdot \omega + \delta F_\delta,$$

where Mi and Mρ represent the internal loss torque by inertia I and friction ρ, Mδ represents the output torque of the motor 5, and Fδ represents the drive force acting on the correcting optical system 2.

Since the coupling between the cam 4 and the movable portion 1 is assumed to be firm, the relation between the rotational system (motor 5) and the translational system (correcting optical system 2) is;

$$M\delta = F_\delta \cdot \delta => \delta = \frac{M\delta}{F_\delta}$$

$$M\delta \cdot \omega = F_\delta \cdot v_{lens} \frac{Y_{lens}}{\alpha} = \frac{v_{lens}}{\omega} = \delta$$

where $Y_{lens}$ and α represent the position and acceleration, respectively, of the movable portion 1. With regard to the movable portion 1, $$F_\delta = F_m + F_k + F_\lambda + F_{const.}$$
$$= (s^2 m + s\lambda + k) Y_{lens} + F_{const,}$$

where $F_m$, $F_k$ and $F_\lambda$ represent respective forces corresponding to the mass m, rigidity k and dynamical friction $\lambda$ of the movable portion 1.

With regard to the whole, $$Y_{lens} = \frac{F_\delta - F_{const}}{s^2 m + s\lambda + k}$$

$$Y_{lens} = \frac{\psi\delta U_{mot}(s) - F_{const}(s)\delta^2(R + sL)}{s^3 L I_{tot} + s^2(L\rho_{tot} + RI_{tot}) + s(Lk\delta^2 + R\rho_{tot} + \psi^2) + Rk\delta^2}$$

$$I_{tot} = I + m\delta^2$$
$$\rho_{tot} = \rho + \lambda\delta^2$$

where the suffix tot represents the total as seen from on the output shaft of the motor.

Assuming that the weight of the movable portion 1 and the pressure $F_{const}$ of the pressure-giving spring 6 are predetermined values, these can be offset by applying to the motor 5 a fixed voltage equal to the voltage $U_{const}$ shown in the following equation:

$$U_{const} = F_{const} \cdot \frac{\delta R}{\psi}$$

In addition to the offsetting of $F_{const}$, the transfer function S(s) which shows the dynamical characteristic of the optical compensating apparatus S can be simplified as follows in the frequency area effective for image stabilization:

$$S(s) = \frac{V_{lens}}{U_{mot}} = \frac{s\psi\delta}{s^2 RI_{tot} + s\psi^2 + Rk\delta^2}$$

Figure 4A:
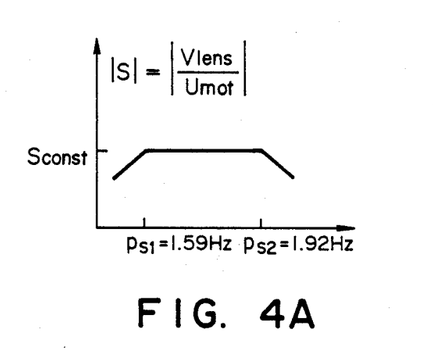
FIG. 4A is a graph showing the frequency characteristic of the optical compensating apparatus S.

FIG. 4A shows the frequency characteristic of this simplified model, and parameters $P_{S1}$, $P_{S2}$ and $S_{const}$ are defined as follows:

$$P_{S1} = \frac{\psi^2}{2RI_{tot}} - \sqrt{\frac{\psi^4}{4R^2 I_{tot}^2} - \frac{k\delta^2}{I_{tot}}}$$

$$P_{S2} = \frac{\psi^2}{2RI_{tot}} + \sqrt{\frac{\psi^4}{4R^2 I_{tot}^2} - \frac{k\delta^2}{I_{tot}}}$$

$$S_{const} = \frac{\psi}{k\delta R} \cdot P_{S1}$$

As can be seen from FIG. 4A, in the low frequency range, the voltage $U_{mot}$ applied to the motor 5 is basically proportional to the displacement of the movable portion 1, and in the high frequency range, the voltage $U_{mot}$ is proportional to the acceleration of the movable portion 1. Between these two frequency ranges, the voltage $U_{mot}$ is proportional to the velocity of the movable portion 1.

Figure 3:
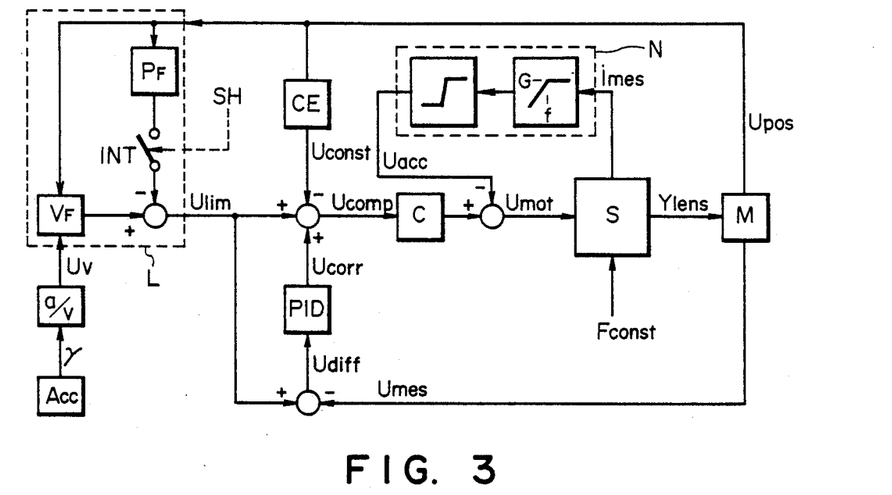
FIG. 3 is a block diagram showing the control system of the optical compensating apparatus of FIG. 1.

By the frequency range in which the voltage $U_{mot}$ is proportional to the velocity of the movable portion 1 being widened to the frequency interval of 1–10 (Hz) necessary for the prevention of image vibration, the automatic control system by velocity as shown in FIG. 3 can be realized. More detailed description will hereinafter be made with reference to the block diagram of FIG. 3.

In FIG. 3, Acc designates an accelerometer for detecting a vibration such as hand vibration acting on the camera when determining the composition by looking into the finder or during film exposure, and outputting it as a signal $\gamma$ proportional to the angular acceleration. This signal $\gamma$ is then integrated by an acceleration-velocity converter a/v, is converted into a signal $U_v$ proportional to the angular velocity characteristic and is input to a signal attenuator $V_F$. In the signal attenuator $V_F$, as will be described later, the signal $U_v$ is weakened as the cam 4 approaches the terminal position to prevent the motor 5 from moving the cam 4 to a position beyond the terminal position and thereby prevent the correcting optical system from causing great image vibration.

Figure 4B:
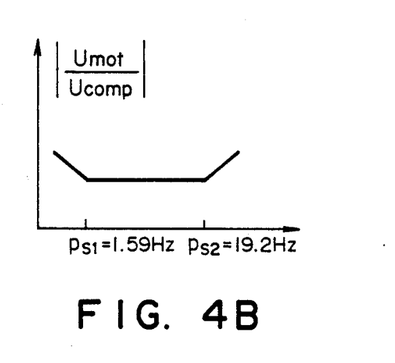
FIG. 4B is a graph showing the frequency characteristic of the electronic compensation module C of the circuit of FIG. 3.
Figure 5:
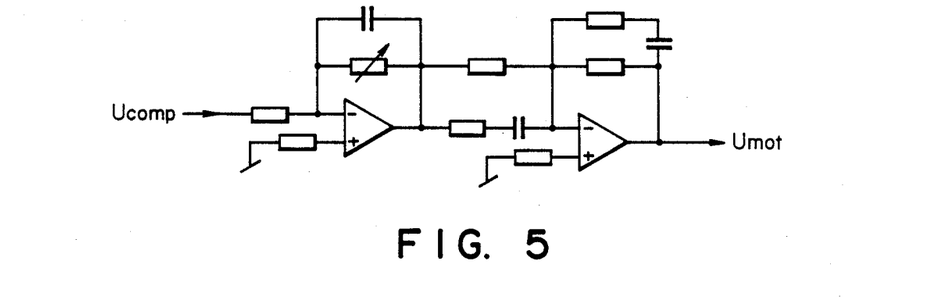
FIG. 5 is a specific circuit diagram of the electronic compensation module C of the circuit of FIG. 3.
Figure 6:
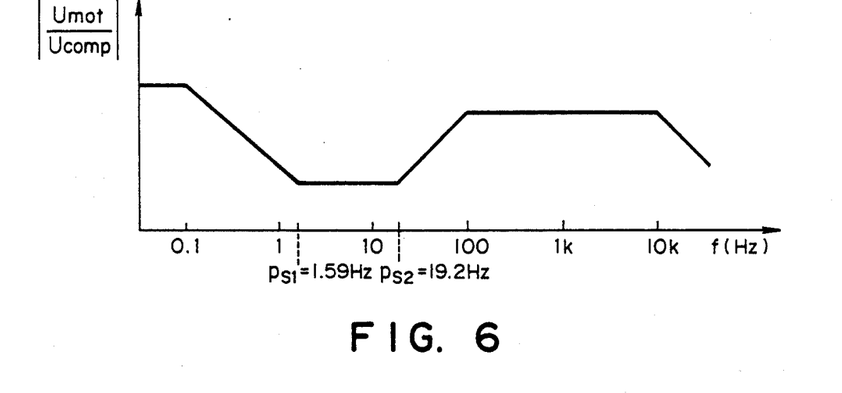
FIG. 6 is a graph showing the frequency characteristic of the circuit of FIG. 5.

The circuits subsequent to the signal attenuator $V_F$ constitute a closed loop, and the output from the signal attenuator $V_F$ is supplied to an electronic compensation circuit C. The electronic compensation circuit C, selects the frequency characteristic of $V_{comp}$ and widens the frequency band of the velocity $V_{lens}$ proportional to the voltage $U_{mot}$ supplied to the motor 5 so that it becomes a frequency band necessary for the prevention of image vibration, and its ideal transfer function shown in FIG. 4B. That is, the electronic compensation circuit C has the zeros of the transfer function to compensate the poles $P_{S1}$ and $P_{S2}$ of the optical compensating apparatus S, as shown in FIGS. 4B and 6. The details of the electronic compensating circuit C are shown in FIG. 5.

FIG. 6 shows the frequency characteristics of the circuit.

As shown in FIG. 3, the voltage $U_{mot}$ supplied from the electronic compensation circuit C is supplied to the motor 5 of the optical compensating apparatus S, and the motor 5 displaces the correcting optical system 2 by the cam 4 in a plane perpendicular to the photographing optic axis in the direction opposite to the direction of image vibration in the imaging plane to thereby prevent image vibration in the imaging plane.

On the other hand, the displacement of the correcting optical system 2 is detected as the position $Y_{lens}$ of the movable portion 1 by a block M which executes highly accurate differentiation measurement. In the block M, the result of this detection is differentiated and a signal $U_{mes}$ proportional to the velocity $V_{lens}$ of the movable portion 1 is output. This signal $U_{mes}$ is supplied to a PID filter to amplify the difference signal $U_{diff}$ between the velocity signal $U_v$ proportional to the vibration acting on the camera and the velocity signal $U_{mes}$ of the movable portion 1 and provide a signal $U_{corr}$, which is reintroduced into at input side of the electronic compensation circuit C.

This closed loop control system plays the role of optically stabilizing the vibration acting on the camera. That is, this control system has for its object to control to minimize the positional deviation resulting from the error between the velocity of the image caused by the vibration velocity $\Omega_{camera}$ of the vibration acting on the camera and the velocity $\Omega_{lens}$ of the correcting optical system fixed to the movable portion 1, i.e., the amount of residual image vibration $\epsilon$, so as to be minimum.

That is, this closed loop control functions on the basis of velocity, and causes a velocity modifying signal to be produced until the velocity error becomes as small as possible. Use may also be made of digital control or automatic position control using a condition variable regulator or the like instead of the PID filter proposed herein.

Figure 7:
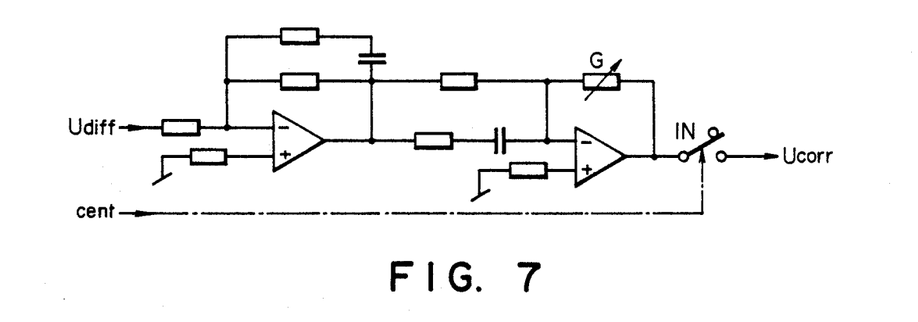
FIG. 7 is a specific circuit diagram of the PID filter of the circuit of FIG. 3.

FIG. 7 shows the circuit diagram of the PID filter. The voltage $U_{diff}$ which is the difference characteristic between the velocity of the movable portion 1 and the velocity of the vibration acting on the camera is amplified by this filter and becomes a correcting voltage $U_{corr}$. In FIG. 7, a switch IN has its opening and closing controlled by a logic signal "cent" output during the centering operation for returning the cam 4 to the initial position which is the neutral position. This centering operation will be described later. The switch IN continues to be opened until the centering operation is terminated.

Figure 8:
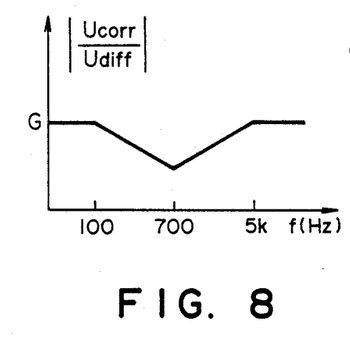
FIG. 8 is a graph showing the frequency characteristic of the circuit of FIG. 7.

FIG. 8 shows the characteristic of the FIG. 7 circuit for the frequency f.

Figure 9:
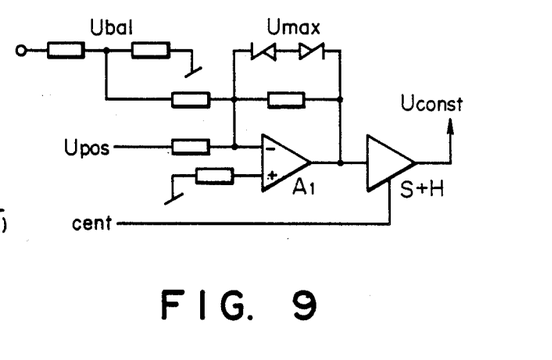
FIG. 9 is a specific circuit diagram of the centering module CE of the circuit of FIG. 3.

Turning back to FIG. 3, a voltage signal $U_{pos}$ proportional to the position $Y_{lens}$ of the movable portion 1 is further output from the block M. The signal $U_{pos}$ is supplied to a centering module CE whose detailed electric circuit is shown in FIG. 9, and forms a second closed loop for the centering operation. As shown in FIG. 9, the signal $U_{pos}$ supplied to the centering module CE is input to a differential amplifier $A_1$, the output of which is input to a sampling and holding circuit S+H which samples when the signal cent is at a high level and which holds at falling of the signal cent, by a logic signal cent output during a centering operation similar to that previously mentioned. By this logic signal cent, the module CE introduces a voltage $U_{const}$ which is a function of the signal $U_{pos}$ representative of the position of the movable portion 1 into this side of the electronic compensation circuit C during the centering operation, as shown in FIG. 3, and drives the motor 5 so as to return the cam 4 to the neutral position, and thereby moves the correcting optical system 2 to the middle of the possible displacement zone. This centering operation has for its object to initially set the correcting optical system 2 to the middle of the possible displacement zone at the start of the image stabilization operation so as to prevent the correcting optical system 2 from striking against the limit of the possible displacement zone, because if the correcting optical system 2 is near the limit of the possible displacement zone, the correcting optical system 2 will strike against the limit of the possible displacement zone during the image stabilization operation to make the image stabilization operation impossible.

Figure 10:
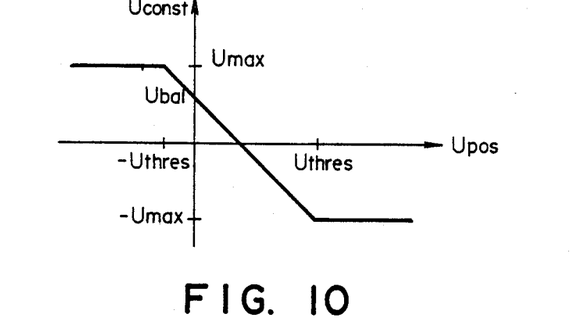
FIG. 10 is a graph showing the input and output characteristics of the circuit of FIG. 9.

FIG. 10 shows the characteristic of the module CE. As shown, when the position of the correcting optical system 2 is outside the range of the threshold value $-U_{thres}$ to $U_{thres}$, a predetermined voltage $U_{max}$ or $-U_{max}$ for moving the correcting optical system 2 toward the center of the possible displacement range at a predetermined velocity is applied to the motor 5. On the other hand, when the correcting optical system 2 is within the range of said threshold value $-U_{thres}$ to $U_{thres}$, the voltage applied to the motor 5 is varied from said predetermined voltage $U_{max}$ or $-U_{max}$ toward a balanced voltage $U_{bal}$ so as to become the balanced voltage $U_{bal}$ when the correcting optical system 2 is at the middle of the possible displacement zone ($U_{pos}=0$). This balanced voltage $U_{bal}$ is for generating a torque with which the motor 5 is stopped in a position in which, at the neutral position of the cam 4, the motor 5 is balanced with the force $F_{const}$ brought by the weight of the movable portion 1 and the pressure of the pressure-giving spring 6 which biases the movable portion 1 against the cam 4.

In FIG. 9, when the movable portion 1 terminates the centering operation, the logic signal cent assumes a low level, and the sampling and holding circuit S+H fixes the output voltage $U_{const}$ to a value in the vicinity of the balanced voltage $U_{bal}$ and thus, the control of the velocity of the movable portion 1 becomes capable of functioning. That is, from this point of time, the correcting optical system 2 becomes movable in the directions of two perpendicular axes in a plane perpendicular to the photographing optic axis for the purpose of the correction of vibration of the image.

Turning back to FIG. 3, the signal $U_{pos}$ proportional to the position $Y_{lens}$ of the movable portion 1 output from the measuring block M is transmitted to a movement range limiting block L in addition to the centering block CE. This movement range limiting block L includes two different function blocks, one of which is a signal attenuator $V_F$ for decreasing the driving velocity of the motor 5 as the movable portion 1 approaches the limit of the possible displacement zone, and preventing the cam 4 from moving to a position beyond the limit position, and the other is a filter $P_F$ for slowly and continuously effecting a centering operation similar to that described above until the shutter starts to open, and always moving the cam 4 toward the neutral position to thereby prevent the cam 4 from being stopped at the limit position by the action of the attenuator $V_F$ and ceasing the image stabilization operation, thereby eliminating the influence of a slow swell of great amplitude during the aiming and making long-time image stabilization possible Also, the filter $P_F$ causes the correcting optical system 2 to return to the middle of the possible displacement of zone and thereby prevents the correcting optical system 2 from striking against the limit of the possible displacement zone to make the image stabilization operation impossible when photographing is actually started even if the direction of the camera is changed and great vibration acts on the camera during the determination of the composition before photographing, and makes the image stabilization operation possible for vibration of high frequency even during the period of slow panning.

The signal attenuator $V_F$ receives as inputs the signal $U_{pos}$ proportional to the position $Y_{lens}$ of the movable portion 1 and a signal $U_v$ which is output from said acceleration-velocity converter a/v and which has a characteristic corresponding to the velocity of the vibration acting on the camera, and decreases the voltage supplied to drive the motor 5 as the movable portion 1 approaches the vicinity of the limit of the possible displacement zone.

Figure 11:
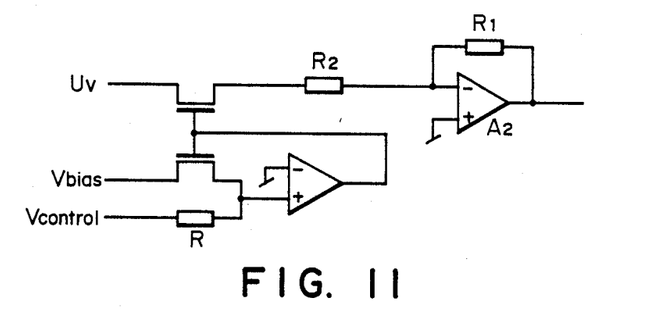
FIG. 11 is a specific circuit diagram of the signal attenuator $V_F$ of the circuit of FIG. 3.
Figure 12:
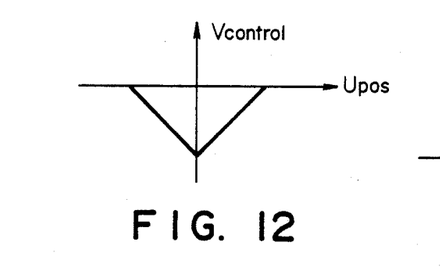
FIGS. 12 and 13 are graphs showing the input and output characteristics of the circuit of FIG. 11.

FIG. 11 shows the construction of the signal attenuator $V_F$. FIG. 12 shows the control signal $V_{control}$ of the attenuator $V_F$ conforming to the signal $U_{pos}$ representative of the position of the movable portion 1 which is output by the block M.

Figure 13:
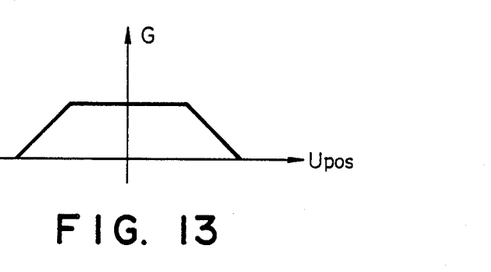

The gain G of the output signal of an amplifier $A_2$ in FIG. 11 for the input signal $U_V$ is a position function of the movable portion 1, as shown in FIG. 13. In the area of the maximum gain, there is an area in which stabilized image is obtained, and the image is not stabilized at the point of the minimum gain. The mean of the gain corresponds to the area which causes the photographer to become aware that too great vibration is acting on the camera. The characteristic of this attenuator can be modified by changing the transition process between the maximum gain and the minimum gain.

On the other hand, the filter $P_F$, as previously described, is for eliminating the influence of long-time low-frequency vibration when determining the composition while looking into the finder and thereby making the image stabilization during the aiming possible and for enabling the direction of the camera to be changed while the vibration preventing operation is continued and therefore, it may be a first-order low-pass filter which extracts low-frequency vibration acting during the aiming or during the change of the direction of the camera, and the output thereof forms such a closed loop which will modify the voltage supplied to the motor 5 so that the cam 4 may go toward the neutral position.

On the other hand, the re-centering operation also impedes the image stabilization action in a low frequency range and therefore, design is made such that during the photographing, this re-centering operation is inhibited and the image stabilization effect of the highest accuracy is ensured. That is, as soon as the photographing is started, a switch INT is opened and the output of the filter $P_F$ is inhibited and the re-centering operation is ceased by a shutter opening signal SH output in response to the start of the photographing.

The filter $P_F$ may be a first-order low-pass filter as described above, but the time constant thereof must be chosen so as to make the re-centering operation effective when the cam 4 has approached the limit. Conversely, when the cam 4 is in the neutral position, the filter $P_F$ must not drop its image stabilizing performance. What is proposed herein is merely one of the following plurality of methods of slowly re-centering the correcting optical system:

a filter which always operates continuously;

a filter which operates only when the cam approaches the limit; and a filter which operates periodically.

Figure 14:
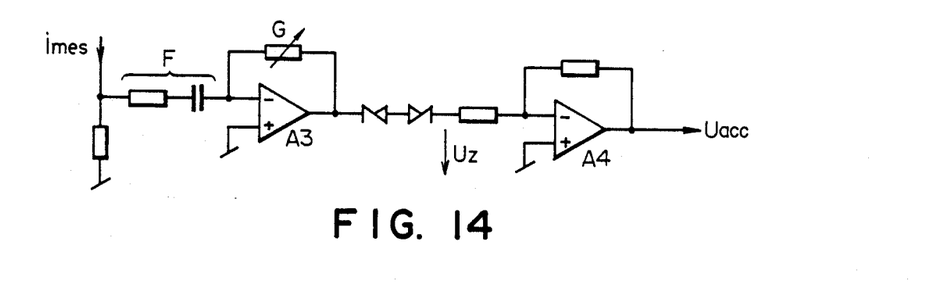
FIG. 14 is a specific circuit diagram of the block N of the circuit of FIG. 3.

Further, in FIG. 3, a block N has a shunt resistor in the input portion thereof and there, a current $i_{mes}$ flowing through the motor 5 is measured, and on the basis of the measured current, a limiting voltage $U_{acc}$ is output and this output voltage $U_{acc}$ is subtracted from the output of the electronic compensation circuit C, whereby a closed loop is formed between it and the optical compensating apparatus S. In the block N, as shown in detail in FIG. 14, the measured current $i_{mes}$ passes through the shunt resistor and produces a potential, and this potential passes through a high-pass filter F and is supplied into a differential amplifier A3. From the time when the AC portion of the current $i_{mes}$ exceeds a predetermined threshold value, a reverse voltage $U_{acc}$ proportional to the excess value $U_Z$ from said threshold value is added to the supplied voltage $U_{mot}$ provided to the motor 5 of the optical compensating apparatus S, whereby the acceleration of the motor 5 is suppressed below the limit acceleration at which the movable portion 1 jumps from the cam 4. That is, when the acceleration transmitted from the motor 5 to the cam 4 exceeds the follow-up limit of the movable portion 1 by the pressure-giving spring 6 relative to the cam 4, the movable portion 1 momentarily jumps from the cam 4 to bring about an uncontrollable condition and therefore, in order to prevent this, the action by this closed loop limits the acceleration of the motor 5 which drives the cam 4 so as not to exceed the follow-up limit of the movable portion 1 by the pressure-giving spring 6 relative to the cam 4. For this purpose, in said closed loop, only the high frequency component (about 100 Hz or more) of the current $i_{mes}$ flowing to the motor 5 is selected by the high-pass filter, and on the basis of this current $i_{mes}$, the acceleration of the motor 5 exceeding a predetermined threshold value is limited, and this is because in the case of such a high frequency, the current flowing to the motor 5 is proportional to the acceleration of the motor 5.

We claim:

1. An image stabilization apparatus including:
   (A) correcting optical means for compensating image vibration;
   (B) driving means for driving said correcting optical means; and
   (C) controlling means for controlling the action of said driving means in response to the approach of the driving limit of said correcting optical means.

2. An image stabilization apparatus according to claim 1, wherein said controlling means includes velocity decreasing means for decreasing the driving velocity of said driving means in response to the approach of said correcting optical means to a possible displacement limit.

3. An image stabilization apparatus according to claim 1, wherein said controlling means includes control means for controlling the driving of said driving means in response to the approach of said correcting optical means to a possible displacement limit so that said correcting optical means is displaced to the middle of a possible displacement zone.

4. An image stabilization apparatus according to claim 3, wherein said control means is designed to act slowly and continuously.

5. An image stabilization apparatus according to claim 3, wherein said control means includes low frequency range responsive means for acting when the vibration acting thereon is of a low frequency range.

6. An image stabilization apparatus according to claim 3, wherein said control means includes inhibiting means for preventing it from acting during the photographing.

7. An image stabilization apparatus according to claim 1, wherein said controlling means includes means for controlling the driving acceleration of said driving means in response to the approach of said correcting optical means to the follow-up limit acceleration for said driving means and rendering the driving acceleration of said driving means suppressible within said follow-up limit acceleration.

8. An image stabilization apparatus according to claim 5, wherein said low frequency range responsive means includes a first-order low-pass filter.

9. A camera including an image stabilization apparatus including:
   (A) correcting optical means for compensating image vibration;
   (B) driving means for driving said correcting optical means; and
   (C) controlling means for controlling the action of said driving means in response to the approach of the driving limit of said correcting optical means.

10. A camera according to claim 9, wherein said controlling means includes velocity decreasing means for decreasing the driving velocity of said driving means in response to the approach of said correcting optical means to a possible displacement limit 11. A camera according to claim 9, wherein said controlling means includes control means for controlling the driving of said driving means in response to the approach of said correcting optical means to a possible displacement limit so that said correcting optical means is displaced to the middle of a possible displacement zone.

12. A camera according to claim 11, wherein said control means is designed to act slowly and continuously.

13. A camera according to claim 11, wherein said control means includes low frequency range responsive means for acting when the vibration acting thereon is of a low frequency range.

14. A camera according to claim 11, wherein said control means includes inhibiting means for preventing it from acting during the photographing.

15. A camera according to claim 9, wherein said controlling means includes means for controlling the driving acceleration of said driving means in response to the approach of said correcting optical means to the follow-up limit acceleration for said driving means and rendering the driving acceleration of said driving means suppressible within said follow-up limit acceleration 16. A camera according to claim 13, wherein said low frequency range responsive means includes a first-order low-pass filter.

* * * * *

UNITED STATES PATENT AND TRADEMARK OFFICE
CERTIFICATE OF CORRECTION

PATENT NO. : 4,970,540          Page 1 of 2

DATED : November 13, 1990

INVENTOR(S) : Francois, VASEY ET AL.

It is certified that error appears in the above-identified patent and that said Letters Patent is hereby corrected as shown below:

COLUMN 1:

Line 19, "280,731." should read --085,731.--; and

Line 58, "cam surface" should read --cam surface,--.

COLUMN 2:

Line 14, "the," should read --the--.

COLUMN 3:

Line 7, "withheld" should read --held--.

COLUMN 4:

Line 14, "dynamical" should read --dynamic--; and

Line 28, "$E = \psi\omega$" should read --$E = \psi.\omega$--.

UNITED STATES PATENT AND TRADEMARK OFFICE
CERTIFICATE OF CORRECTION

PATENT NO. : 4,970,540
DATED : November 13, 1990
INVENTOR(S) : Francois VASEY, ET AL.

It is certified that error appears in the above-identified patent and that said Letters Patent is hereby corrected as shown below:

COLUMN 5:

Line 28, "dynamical" should read --dynamic--.

COLUMN 6:

Line 51, "at" should read --an--; and

Line 61, "residual image vibration E," should read --residual image vibration $\xi$,--.

COLUMN 10:

Line 64, "limit" should read --limit.--.

Signed and Sealed this

Twenty-first Day of July, 1992

*Attest:*

DOUGLAS B. COMER

*Attesting Officer*   *Acting Commissioner of Patents and Trademarks*